United States Patent
Ishiyama et al.

(10) Patent No.: US 10,719,943 B2
(45) Date of Patent: Jul. 21, 2020

(54) PROGRAM AND IMAGE PROCESSING DEVICE

(71) Applicant: CYGAMES, INC., Tokyo (JP)

(72) Inventors: Hidetoshi Ishiyama, Tokyo (JP); Shuichi Kurabayashi, Tokyo (JP)

(73) Assignee: CYGAMES, INC., Tokyo (JP)

( * ) Notice: Subject to any disclaimer, the term of this patent is extended or adjusted under 35 U.S.C. 154(b) by 115 days.

(21) Appl. No.: 16/148,629

(22) Filed: Oct. 1, 2018

(65) Prior Publication Data
US 2019/0035089 A1    Jan. 31, 2019

Related U.S. Application Data

(63) Continuation of application No. PCT/JP2017/001898, filed on Jan. 20, 2017.

(30) Foreign Application Priority Data

Apr. 1, 2016  (JP) ................................. 2016-074565

(51) Int. Cl.
*G06T 7/20* (2017.01)
*G06T 7/246* (2017.01)
(Continued)

(52) U.S. Cl.
CPC .............. *G06T 7/246* (2017.01); *G06F 3/014* (2013.01); *G06F 3/017* (2013.01); *G06F 3/0304* (2013.01);
(Continued)

(58) Field of Classification Search
CPC ........ G06F 3/0304; G06F 3/014; G06F 3/017; G06K 9/00624; G06K 9/2063; G06K 9/00671; G06T 7/73; G06T 7/60
See application file for complete search history.

(56) References Cited

U.S. PATENT DOCUMENTS

2004/0087366 A1*  5/2004  Shum .................... A63F 13/428
                                                                463/36
2006/0187196 A1*  8/2006  Underkoffler ........... G06F 3/017
                                                                345/156
(Continued)

FOREIGN PATENT DOCUMENTS

JP     2014-038543       *  2/2014
JP     2017-187859 A       10/2017
WO     2015/139750 A1       9/2015

OTHER PUBLICATIONS

Machine translation for JP 2014-038543 (Year: 2014).*
(Continued)

*Primary Examiner* — Qian Yang
(74) *Attorney, Agent, or Firm* — Osha Liang LLP

(57) ABSTRACT

A program stored on a non-transitory computer readable medium executable on a computer to perform discriminating a fiducial marker from captured images successively output from a camera, based on marker information representing associations between fiducial markers and object identifiers, identifying start points of one or more structured markers in the captured images based on the discriminated fiducial marker and position information defined in association with the fiducial marker, determining states of the one or more structured markers continuing from the start points, and outputting an operation instruction in accordance with the determined states of the one or more structured markers to an object discriminated based on the object identifier associated with the discriminated fiducial marker.

8 Claims, 16 Drawing Sheets

(51) Int. Cl.
*G06F 3/03* (2006.01)
*G06K 9/00* (2006.01)
*G06K 9/20* (2006.01)
*G06F 3/01* (2006.01)
*G06T 7/60* (2017.01)
*G06T 7/73* (2017.01)

(52) U.S. Cl.
CPC ....... *G06K 9/00624* (2013.01); *G06K 9/2063* (2013.01); *G06T 7/60* (2013.01); *G06T 7/73* (2017.01); *G06K 9/00671* (2013.01)

(56) References Cited

U.S. PATENT DOCUMENTS

| | | | | |
|---|---|---|---|---|
| 2008/0285854 | A1* | 11/2008 | Kotake | G06T 7/73 382/190 |
| 2013/0326376 | A1* | 12/2013 | Stachniak | G06F 3/03547 715/762 |
| 2015/0109481 | A1* | 4/2015 | Hayakawa | G06T 19/006 348/239 |

OTHER PUBLICATIONS

International Search Report issued in Application No. PCT/2017/001898, dated Feb. 14, 2017 (2 pages).
Written Opinion issued in International Application No. PCT/JP2017/001898, dated Feb. 14, 2017 (4 pages).

\* cited by examiner

Fig. 4

| FIDUCIAL-MARKER INFORMATION | STRUCTURED-MARKER INFORMATION | FIDUCIAL-POINT INFORMATION | OBJECT ID |
|---|---|---|---|
| F1 | S1 | P1 | A1 |
| F2 | S2 | P2 | A2 |
| ⋮ | ⋮ | ⋮ | ⋮ |

| FINGER STATUS | PATTERN |
|---|---|
| (900a, 900b, 900c shown) | 01 |
| (900a, 900b, 900c shown) | 02 |
| (900a, 900b, 900c shown) | 03 |
| (900a, 900b, 900c shown) | 04 |

Fig. 14

|   | A1 | A2 | A3 | ... | Am |
|---|----|----|----|-----|----|
| C1 | 0.4 | 0.7 | 0.9 | ... | |
| C2 |  | 0.9 |  | ... | |
| C3 |  | 0.4 |  | ... | |
| ⋮ | ⋮ | ⋮ | ⋮ | ⋱ | ⋮ |
| Cn |  |  |  | ... | |

PROGRAM AND IMAGE PROCESSING DEVICE

TECHNICAL FIELD

The present invention relates to programs and image processing devices.

BACKGROUND ART

Recently, there has been interest in the type of system that captures an image of an object by using an imaging device, such as a camera, and that uses the state of the captured object for the purpose of information input from a user. Patent Literature 1 discloses an example of such technology. In the system disclosed in Patent Literature 1, the motion of a user's hand is detected on the basis of an image of a glove that the user is wearing. Specifically, the glove has markers on the palm and individual fingertip portions, and the motion of the user's hand is detected by recognizing the states of these markers.

CITATION LIST

Patent Literature

[PTL 1]
PCT International Publication No. 2015/139750

SUMMARY OF INVENTION

By employing the method disclosed in Patent Literature 1, it is possible to recognize the states of markers attached to a glove or the like and to detect the motion of a user's hand. However, in the case where a plurality of users are present, it is not possible to determine the identity of the user associated with the hand. That is, it is not possible to determine to which user a glove included in an image captured by a camera belongs. Thus, for example, in the case where a plurality of users wearing gloves participate in and play a game in a space whose image is captured, it is not possible to determine an object to which an operation instruction is to be issued in accordance with the state of a discriminated marker.

Embodiments of the present invention have been made in view of the situation described above, and make it possible to determine which object a discriminated marker is associated with and to output an operation instruction to that object in accordance with the state of the marker.

A program according to an aspect of the present invention allows a computer to realize a fiducial-marker discrimination unit that discriminates a fiducial marker from captured images successively output from a camera, on the basis of marker information representing associations between fiducial markers and object identifiers; a start-point identification unit that identifies the start points of one or more structured markers in the captured images on the basis of the discriminated fiducial marker and position information defined in association with the fiducial marker; a structured-marker determination unit that determines the states of the one or more structured markers continuing from the start points; and an operation instruction unit that outputs an operation instruction in accordance with the determined states of the one or more structured markers to an object discriminated on the basis of the object identifier associated with the discriminated fiducial marker.

Note that, in the present invention, the term "unit" encompasses the case where it does not simply refer to a physical means but the function of the "unit" is realized by software. Furthermore, the function of a single "unit" or device may be realized by two or more physical means or devices, and the functions of two or more "units" or devices may be realized by a single physical means or device.

Embodiments of the present invention make it possible to determine which object a discriminated marker is associated with and to output an operation instruction to that object in accordance with the state of the marker.

BRIEF DESCRIPTION OF DRAWINGS

FIG. 4 is a diagram showing an example of marker information.

FIG. 12 is an illustration showing an example of patterns of the state of a structured marker.

FIG. 14 is an illustration showing an example of an accuracy information table for selecting a fiducial marker 500 on the basis of discrimination accuracies.

DETAILED DESCRIPTION

Figure 1:
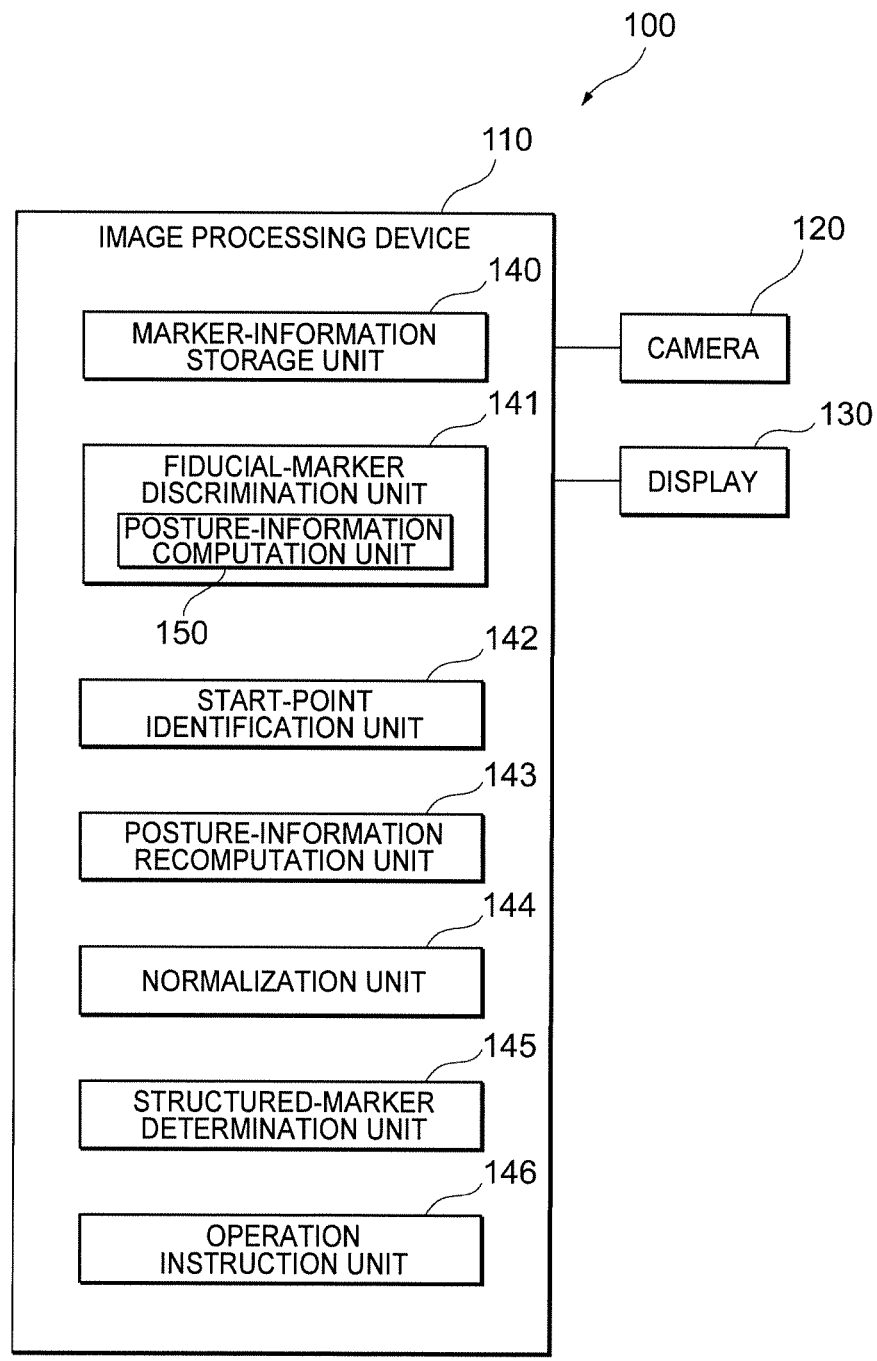
FIG. 1 is a diagram showing the configuration of an image processing system 100 according to an embodiment of the present invention.

Embodiments of the present invention will be described below with reference to the drawings. FIG. 1 is a diagram showing the configuration of an image processing system 100 according to an embodiment of the present invention. The image processing system 100 includes an image processing device 110, a camera 120, and a display 130. The camera 120 and the display 130 may be built into the image processing device 110. Furthermore, the image processing device 110 includes a marker-information storage unit 140, a fiducial-marker discrimination unit 141, a start-point identification unit 142, a posture-information recomputation unit 143, a normalization unit 144, a structured-marker determination unit 145, and an operation instruction unit 146. Furthermore, the fiducial-marker discrimination unit 141 includes a posture-information computation unit 150. The image processing device 110 is an information processing device such as a smartphone, a tablet terminal, or a personal computer. The image processing device 110 includes a processor and a memory and can realize various functions, including those of the individual units shown in FIG. 1, by executing programs stored in the memory.

Figure 2:
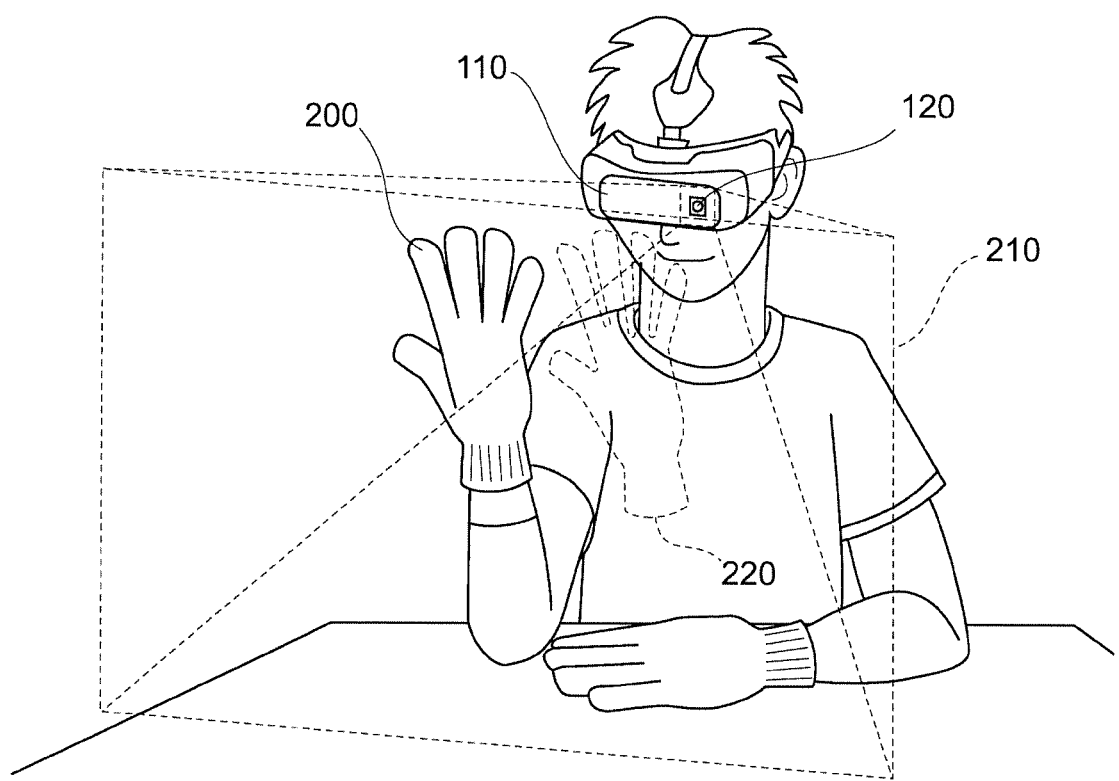
FIG. 2 is an illustration for explaining a usage scenario of the image processing system 100.

FIG. 2 is an illustration for explaining a usage scenario of the image processing system 100. In the example shown in FIG. 2, a user wears a glove 200. The glove 200 has markers attached thereto, which will be described later. The markers attached to the glove 200 are recognized by the camera 120, and an instruction for operating an object 220 in an AR space (frustum) 210 is issued in accordance with the result of recognition. For example, the object 220 is drawn so as to follow the movement of the user's fingers.

Figure 3:
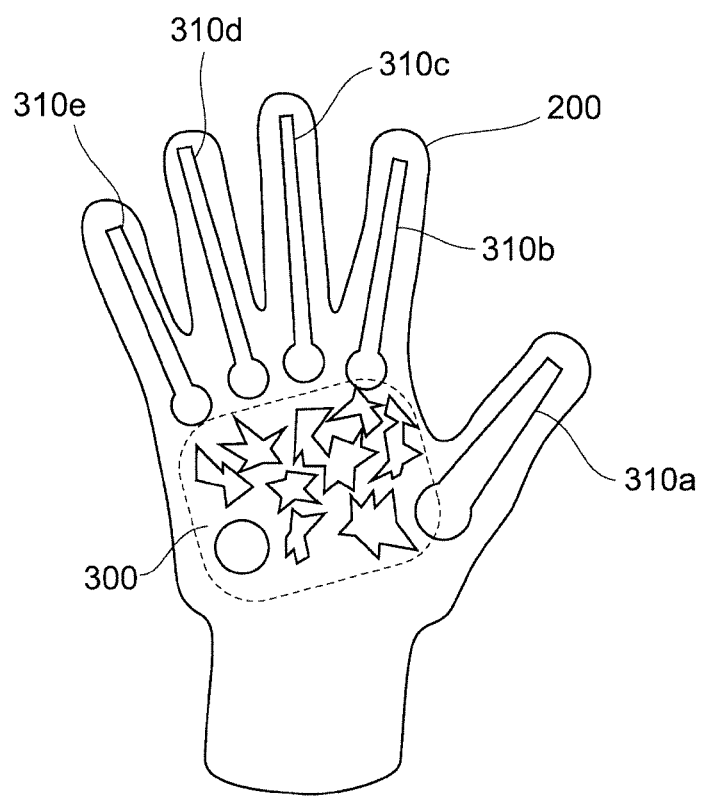
FIG. 3 is an illustration showing an example of markers attached to a glove 200.

FIG. 3 is an illustration showing an example of the markers attached to the gloves 200. As shown in FIG. 3, a fiducial marker 300 and structured markers 310 (310*a* to 310*e*) are provided on the gloves 200. The color of the fiducial marker 300 and the structured markers 310 should preferably have a relatively large contrast in relation to the color of the gloves 200. For example, in the case where the color of the gloves 200 is black, the color of the fiducial marker 300 and the structured markers 310 may be white.

The fiducial marker 300 serves to discriminate among objects 220 and is provided in a portion corresponding to the palm, where state changes are relatively small (or where it is presupposed that no state changes occur). Here, an example of a state change is deformation. The structured markers 310 (310*a* to 310*e*) serve to issue an instruction for operating the object 220 on the basis of the states thereof and are provided in finger portions, where state changes are relatively large (or where it is presupposed that state changes occur).

Note that, although the glove 200 is given as an example of an object to which markers are attached in this embodiment, markers may be attached to objects other than the glove 200, and any object having a region where state changes are relatively small and a region where state changes are relatively large may be adopted. As an example, the fiducial marker 300 may be attached to the chest portion of a shirt, and the structured markers 310 may be attached to the sleeve portions of the shirt. As another example, the fiducial marker may be attached to the torso portion of a human-shaped structure having movable arms, and the structured markers may be attached to the arm portions. Furthermore, although the fiducial marker 300 is represented by a set of graphics in FIG. 3, this is just an example, and the fiducial marker 300 may be represented by only one graphic. The structured markers 310 are just an example. That is, arbitrary shapes may be adopted for the shapes of markers. Furthermore, although this embodiment will be described in the context of an example where the structured markers 310 are provided separately from the fiducial marker 300, structured markers may include a fiducial marker. Specifically, structured markers may be implemented by a set of the fiducial marker 300 and the structured markers 310.

Referring back to FIG. 1, the individual units of the image processing device 110 will be described. The marker-information storage unit 140 has stored therein, in advance, marker information representing associations between fiducial markers and object IDs for discriminating among objects 220. FIG. 4 is a diagram showing an example of the marker information. As shown in FIG. 4, the marker information includes fiducial-marker information 400 representing the features of fiducial markers, structured-marker information 410 representing the features of structured markers, fiducial-point information 420 representing the features of fiducial points that are used when recomputing the postures of the fiducial markers, and object IDs 430 for discriminating among objects 220.

The fiducial-marker information 400 includes, for example, information representing the features of an image of a fiducial marker (e.g., feature quantity vectors). The structured-marker information 410 includes, for example, start-point position information representing the positional relationship of the start point of structured markers in relation to a fiducial marker and information representing the features of an image of the structured markers (e.g., feature quantity vectors). The fiducial-point information 420 includes fiducial-point information representing the positional relationship of a fiducial point in relation to a fiducial marker. In the marker information, the fiducial-marker information 400 varies for the individual object IDs 430. Note that the marker-information storage unit 140 may be provided outside the image processing device 110. For example, the marker-information storage unit 140 may be provided on a cloud server.

Figure 5:
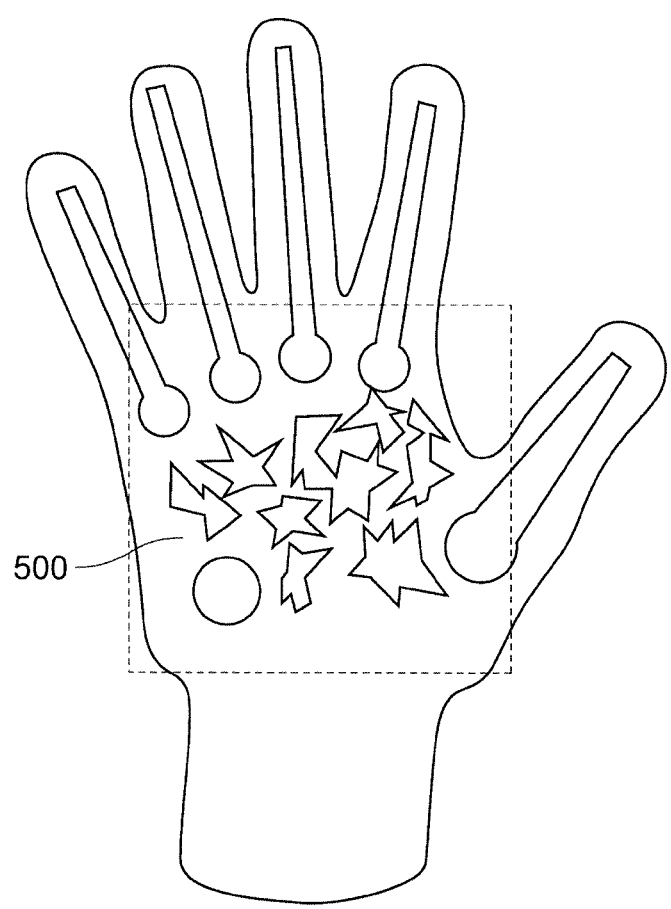
FIG. 5 is an illustration for explaining the discrimination of a fiducial marker.

The fiducial-marker discrimination unit 141, on the basis of the marker information stored in the marker-information storage unit 140, discriminates fiducial markers from captured images successively output from the camera 120. FIG. 5 is an illustration for explaining the discrimination of a fiducial marker. As shown in FIG. 5, the fiducial-marker discrimination unit 141 discriminates a fiducial marker 500 in captured images. As will be described later, the fiducial marker 500 is an image region discriminated from the captured images as having a certain similarity to the fiducial-marker information 400. This discrimination involves the computation of posture information by the posture-information computation unit 150, as well as the detection as to the presence or absence of the fiducial marker 500 in the captured images. The posture information is a concept including a position, an angle, a distance, etc. The detection as to the presence or absence of the fiducial marker 500 from the captured images and the computation of posture information can be realized by using known image processing techniques (computer vision) as appropriate and thus will not be described in detail. For example, the detection and the computation are realized by detecting, from the captured images, a set of feature points satisfying a certain similarity to the fiducial-marker information 400 stored in the marker-information storage unit 140, and performing computation to solve a PnP (Perspective N-point) problem by using the feature points. Furthermore, upon discriminating the fiducial marker 500, the fiducial-marker discrimination unit 141 outputs accuracy information representing the discrimination accuracy on the basis of the similarity to the fiducial-marker information 400. In order to share the accuracy information with other image processing devices, the fiducial-marker discrimination unit 141 sends the accuracy information to a cloud server or other image processing devices. The accuracy information includes, for example, the object ID associated with the discriminated fiducial marker 500 and the discrimination accuracy (e.g., a value in a range of 0 to 1). Furthermore, in the case where a plurality of kinds of information (e.g., F1, F2, . . . ) is stored in the marker-information storage unit 140 as the fiducial-marker information 400, the fiducial-marker discrimination unit 141 discriminates a plurality of fiducial markers 500 in the captured images. In the case where the plurality of fiducial markers 500 have been discriminated, the fiducial-marker discrimination unit 141 outputs accuracy information for the individual fiducial markers 500.

Figure 6:
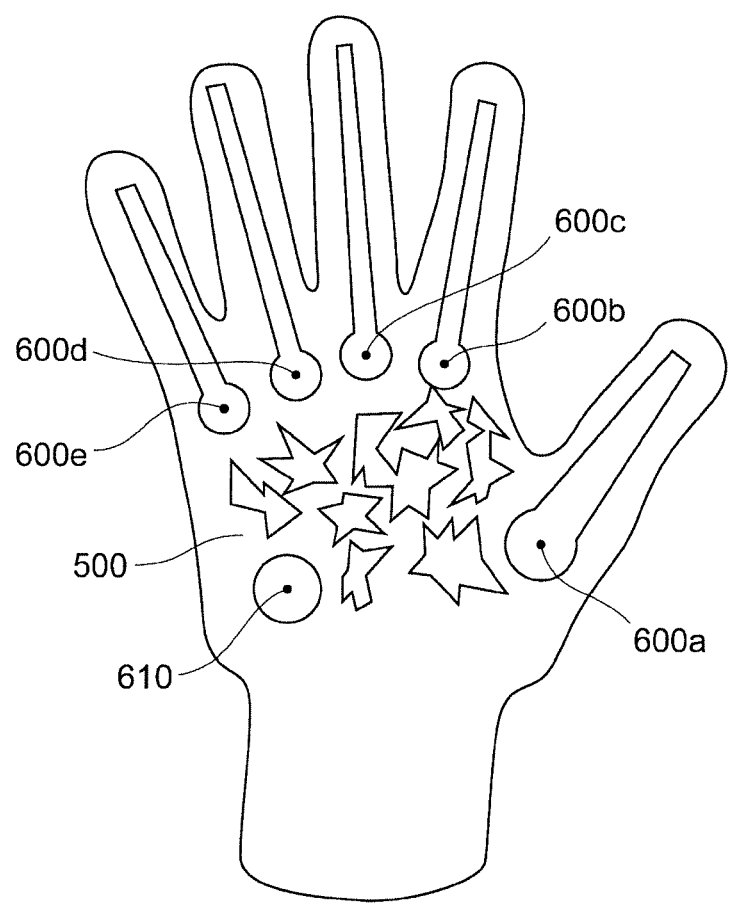
FIG. 6 is an illustration for explaining the identification of a start point and a fiducial point.

The start-point identification unit 142 identifies the start points of one or more structured markers in the captured images on the basis of the discriminated fiducial marker 500 and the structured-marker information 410 stored in the marker-information storage unit 140. Furthermore, the start-point identification unit 142 identifies one or more fiducial points in the captured images on the basis of the discriminated fiducial marker 500 and the fiducial-point information 420 stored in the marker-information storage unit 140 in association with the fiducial-marker information 400 for discriminating the fiducial marker 500. FIG. 6 is an illustration for explaining the identification of start points and fiducial points. The positional relationship of a start point of structured markers in relation to a fiducial marker is represented by the start-point position information included in the structured-marker information 410 stored in the marker-information storage unit 140. Furthermore, the positional relationship of a fiducial point in relation to a fiducial marker is represented by the fiducial-point information stored in the marker-information storage unit 140. The positional relationships of a start point 600 and a fiducial point 610 in relation to the fiducial marker 500 change in accordance with the posture of the fiducial marker 500. Thus, the start-point identification unit 142 converts the start-point position information and the fiducial-point information by using the posture information computed by the posture-information computation unit 150 to identify the start point 600 and the fiducial point 610 associated with the fiducial marker 500. Note that although only one fiducial point is shown in FIG. 6, a plurality of fiducial points exist. In the example in FIG. 6, start points 600*a*, 600*b*, and 600*e* also serve as fiducial points.

Meanwhile, since the palm deforms in practice, the positional relationships of the start point 600 and the fiducial point 610 in relation to the fiducial marker 500 change in accordance with the state of the glove at the moment when an image thereof is captured by the camera 120. Thus, the positions of the identified start point 600 and fiducial point 610 may differ from predesigned ideal positions. Thus, the start-point identification unit 142 corrects the start point 600 and the fiducial point 610, for example, by way of mean shift.

Figure 7:
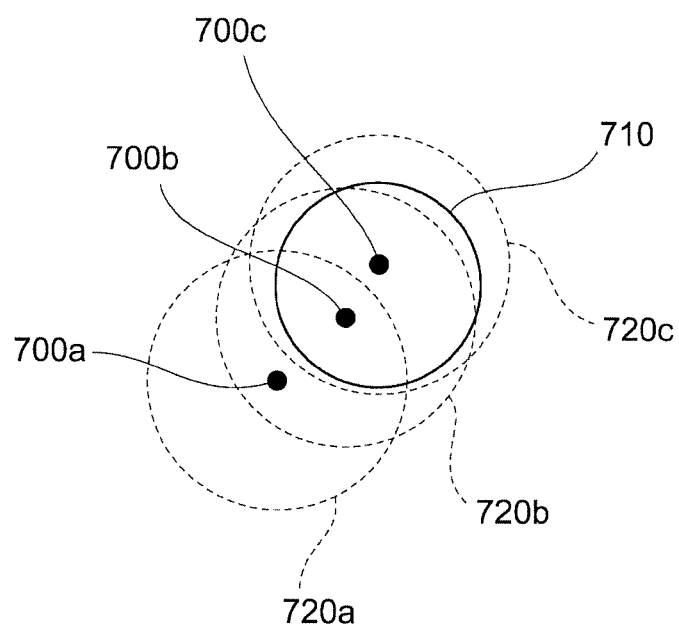
FIG. 7 is an illustration showing an example of correction of a start point and a fiducial point by way of a mean shift.

FIG. 7 is an illustration showing an example in which the start point 600 and the fiducial point 610 are corrected by way of a mean shift. In FIG. 7, points 700 (700*a* to 700*c*) each correspond to a start point or a fiducial point. Furthermore, in FIG. 7, a region 710 is a region including a start point or a fiducial point. The start-point identification unit 142 dictates a circle 720*a* centered at an identified point 700*a* and having a predetermined size. The start-point identification unit 142 obtains a center-of-gravity point 700*b* with reference to the color of structured markers (e.g., white) in the circle 720*a*. Then, the start-point identification unit 142 dictates a circle 720*b* centered at the center-of-gravity point 700*b*. Furthermore, the start-point identification unit 142 obtains a center-of-gravity point 700*c* in the circle 720*b* and dictates a circle 720*c* centered at the center-of-gravity point 700*c*. In the example shown in FIG. 7, since the region 710 has a greater width compared with the other portions of the structured markers, through a repetition of mean shift processing, the centers-of-gravity 700 converge to the vicinity of the region 710, whereby the points 700 are corrected. That is, the initially identified point 700*a* is corrected to the point 700*c* in the region 710. It can be said that this correction converts numerically computed information about the start point 600 and the fiducial point into more accurate information by utilizing the features of a captured image representing the actual state of a hand.

The posture-information recomputation unit 143 reobtains position information of the fiducial markers 500 on the basis of the corrected fiducial points 610 (including some of the start points 600). Specifically, the posture-information recomputation unit 143 recomputes the posture information computed by the posture-information computation unit 150 by using the corrected fiducial points 610. The recomputation of posture information is realized, for example, by performing computation to solve a PnP problem on the basis of the fiducial-point position information stored in the marker-information storage unit 140 and the corrected fiducial points 610. Through this recomputation, more accurate posture information is obtained.

The normalization unit 144, on the basis of the posture information recomputed by the posture-information recomputation unit 143, normalizes the captured images such that the discriminated fiducial marker 500 exhibits a predetermined posture. Note that, in the normalization of the captured images, coordinate information of the captured images is subjected to conversion in order to facilitate the determination of the state of structured markers in the captured images.

Figure 8:
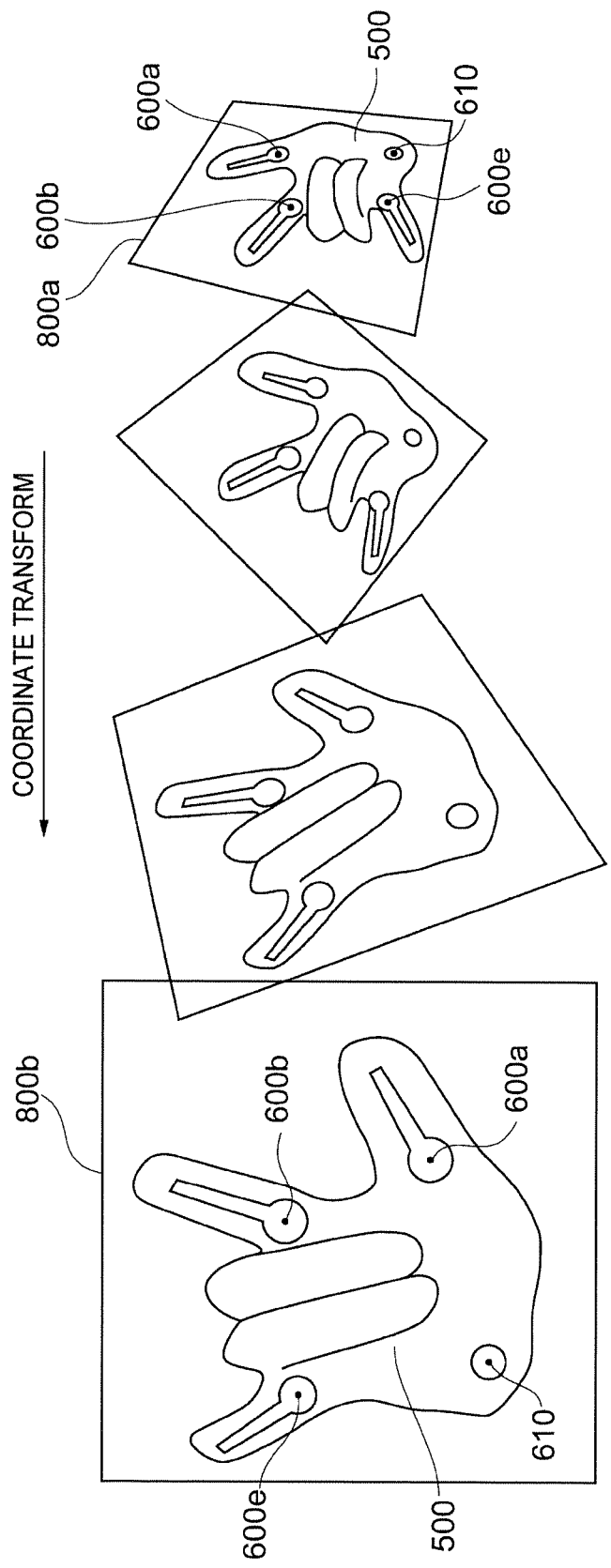
FIG. 8 is an illustration for explaining an example of normalization of captured images.

FIG. 8 is an illustration for explaining the normalization of a captured image. A captured image 800*a* includes an image of a glove. As described earlier, the posture information in the captured image 800*a* is recomputed by the posture-information recomputation unit 143 on the basis of the corrected fiducial points 600*a*, 600*b*, 600*e*, and 610. On the basis of the recomputed posture information, the normalization unit 144 converts the coordinate value of the captured image 800*a* such that the fiducial marker 500 has information represented by a predetermine posture, thereby generating a captured image 800*b*. In the example shown in FIG. 8, the predetermined posture is a posture in which the palm faces the front and the wrist is located on the lower side. Such normalization can be performed, for example, by way of homography transformation. By performing normalization as described above, it becomes easy to determine the state of structured markers in the captured images. For example, in the normalized captured image 800*b*, the direction in which structured markers are formed from the start points 600 is obvious from the design of the glove. Thus, it becomes easy to design an algorithm used for the determination of the state of the structured markers by the structured-marker determination unit 145.

Figure 9:
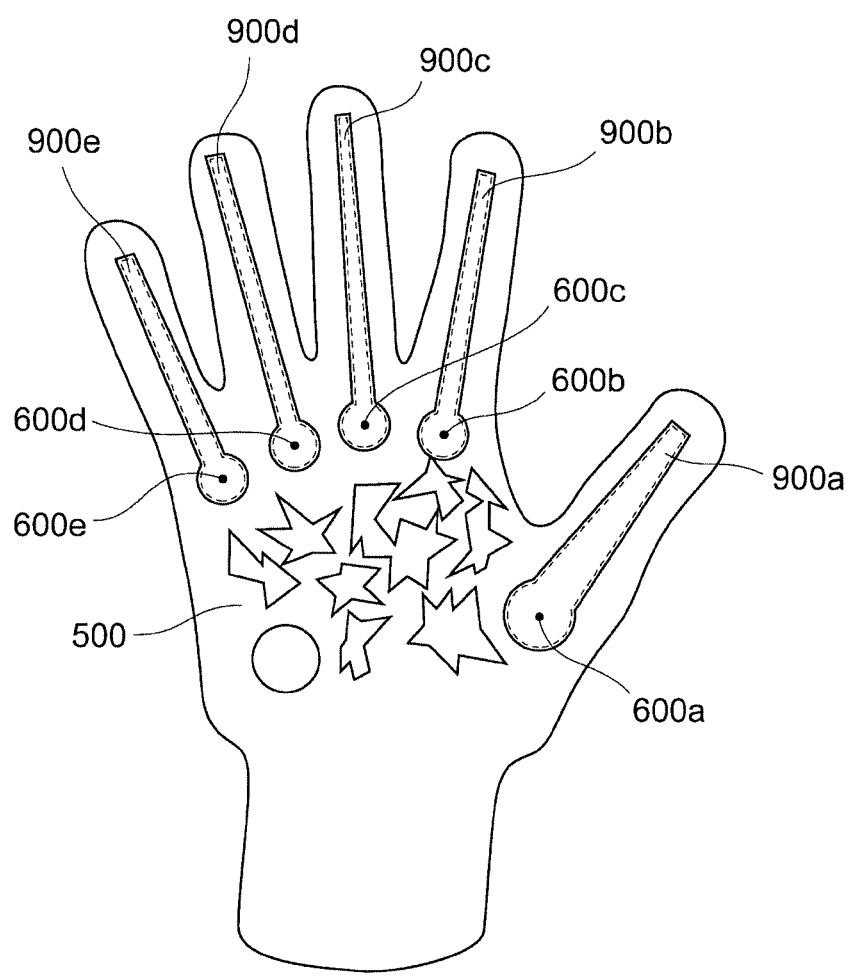
FIG. 9 is an illustration for explaining the determination of the state of a structured marker.

The structured-marker determination unit 145 determines the states of structured markers continuing from the start points 600 in the normalized captured images. FIG. 9 is an illustration for explaining the determination of the state of structured markers. As shown in FIG. 9, the structured-marker determination unit 145 can determine the states of structured markers 900 (900*a* to 900*e*) by searching the regions continuing from the start points 600 (600*a* to 600*e*). Specifically, the structured-marker determination unit 145 determines the states of the structured markers 900 by searching inside the captured images, starting from the start points 600 in the normalized captured images, on the basis of the structured-marker information 410 stored in the marker-information storage unit 140. The structured-marker information 410 includes information identifying an algorithm used to determine the states of the structured markers 900.

Figure 10:
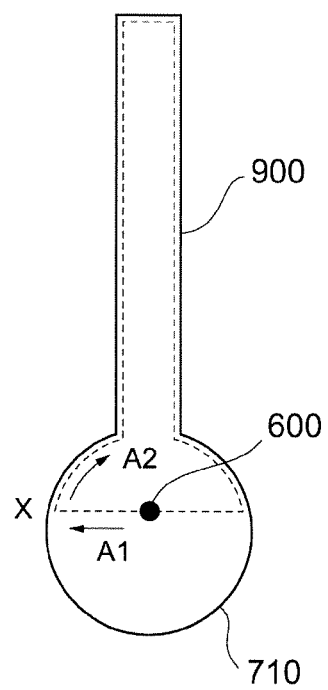
FIG. 10 is an illustration showing an example in which the state of a structured marker is determined by using a maze exploration algorithm.

FIG. 10 is an illustration showing an example for determining the state of a structured marker by using a maze exploration algorithm (wall follower). The structured-marker determination unit 145 proceeds with exploration in a certain direction (e.g., the direction of an arrow A1 shown in FIG. 10), starting from a start point 600, in a normalized captured image. Then, upon reaching a point where the contrast changes considerably (e.g., a point X shown in FIG. 10), the structured-marker determination unit 145 changes the exploration direction into the direction opposite to the fiducial marker 500 (e.g., the direction of A2 shown in FIG. 10). In this manner, the structured-marker determination unit 145 regards the edge portion of the structured marker 900 as the wall of the maze and proceeds with exploration along the wall, thereby computing the direction and length of the structured marker 900. Obviously, the maze exploration algorithm is merely an example, and it is possible to adopt various methods utilizing the detection of a boundary where the contrast significantly changes from captured images, starting from a start point 600. Specifically, the structured-marker determination unit 145 can select an algorithm used to determine the state of a structured marker 900 on the basis of the structured-marker information 410 stored in the marker-information storage unit 140.

Figure 11:
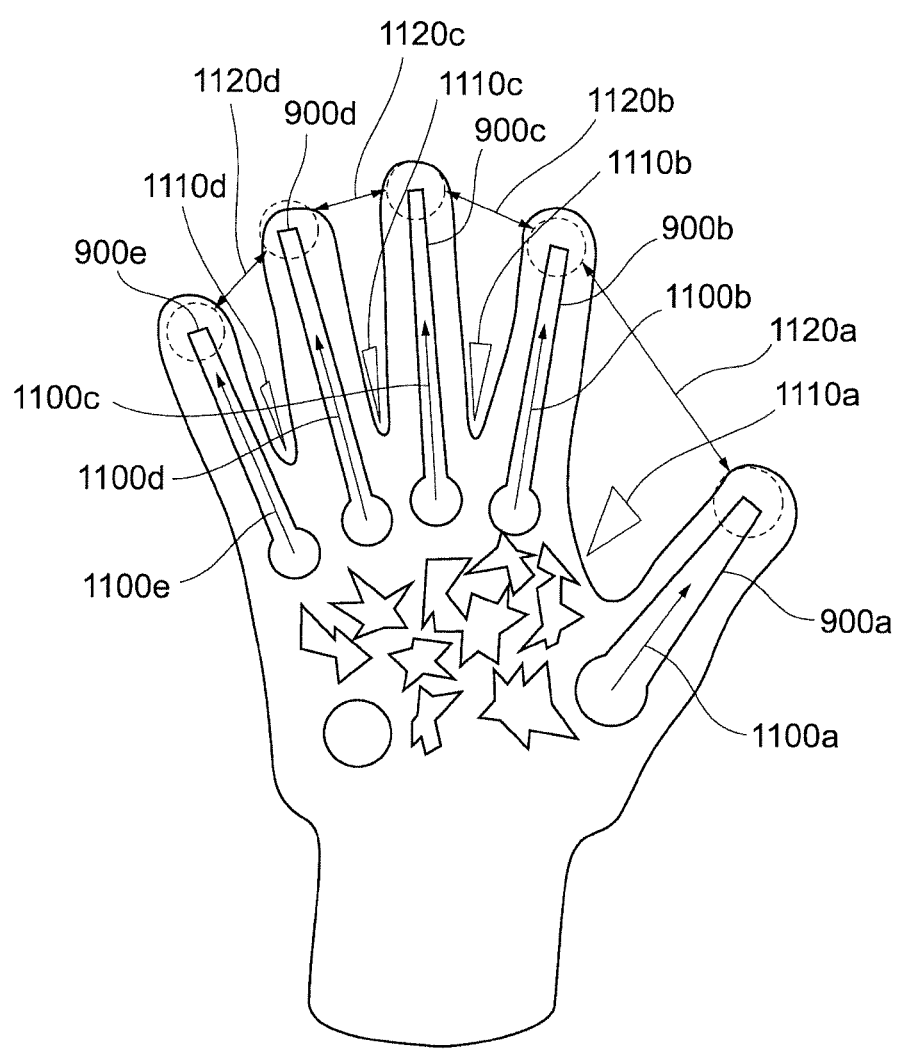
FIG. 11 is an illustration for explaining the state of a structured marker.

The structured-marker determination unit 145 can detect the states of a plurality of structured markers 900, dictated by the structured markers 900, by computing the directions and lengths of the individual structured markers 900. FIG. 11 is an illustration for explaining the states of structured markers. As shown in FIG. 11, the states of the structured markers 900 include the directions and lengths 1100 (1100*a* to 1100*e*) of the individual structured markers 900, the angles 1110 (1110*a* to 1110*d*) between adjacent structured markers 900, and the distances 1120 (1120*a* to 1120*d*) between the tips of adjacent structured markers 900.

Furthermore, the structured-marker determination unit 145 can also recognize the states of a plurality of structured markers 900 as a pattern. FIG. 12 is an illustration showing examples of a pattern of the states of structured markers 900. FIG. 12 shows four patterns. In each pattern, the ring finger and the little finger are bent, and thus structured markers 900*d* and 900*e* are not recognized. In pattern 01, the thumb (structured marker 900*a*) and the index finger (structured marker 900*b*) are separated from each other, and the index finger (structured marker 900*b*) and the middle finger (structured marker 900*c*) are in contact with each other. In pattern 02, the thumb (structured marker 900*a*) and the index finger (structured marker 900*b*) are separated from each other, and the index finger (structured marker 900*b*) and the middle finger (structured marker 900*c*) are also separated from each other. In pattern 03, the thumb (structured marker 900*a*) and the index finger (structured marker 900*b*) are in contact with each other, and the index finger (structured marker 900*b*) and the middle finger (structured marker 900*c*) are separated from each other. In pattern 04, the thumb (structured marker 900*a*) and the index finger (structured marker 900*b*) are in contact with each other, and the index finger (structured marker 900*b*) and the middle finger (structured marker 900*c*) are also in contact with each other. As described above, the structured-marker determination unit 145 can also detect the states of a plurality of structured markers 900 as a pattern.

Figure 13:
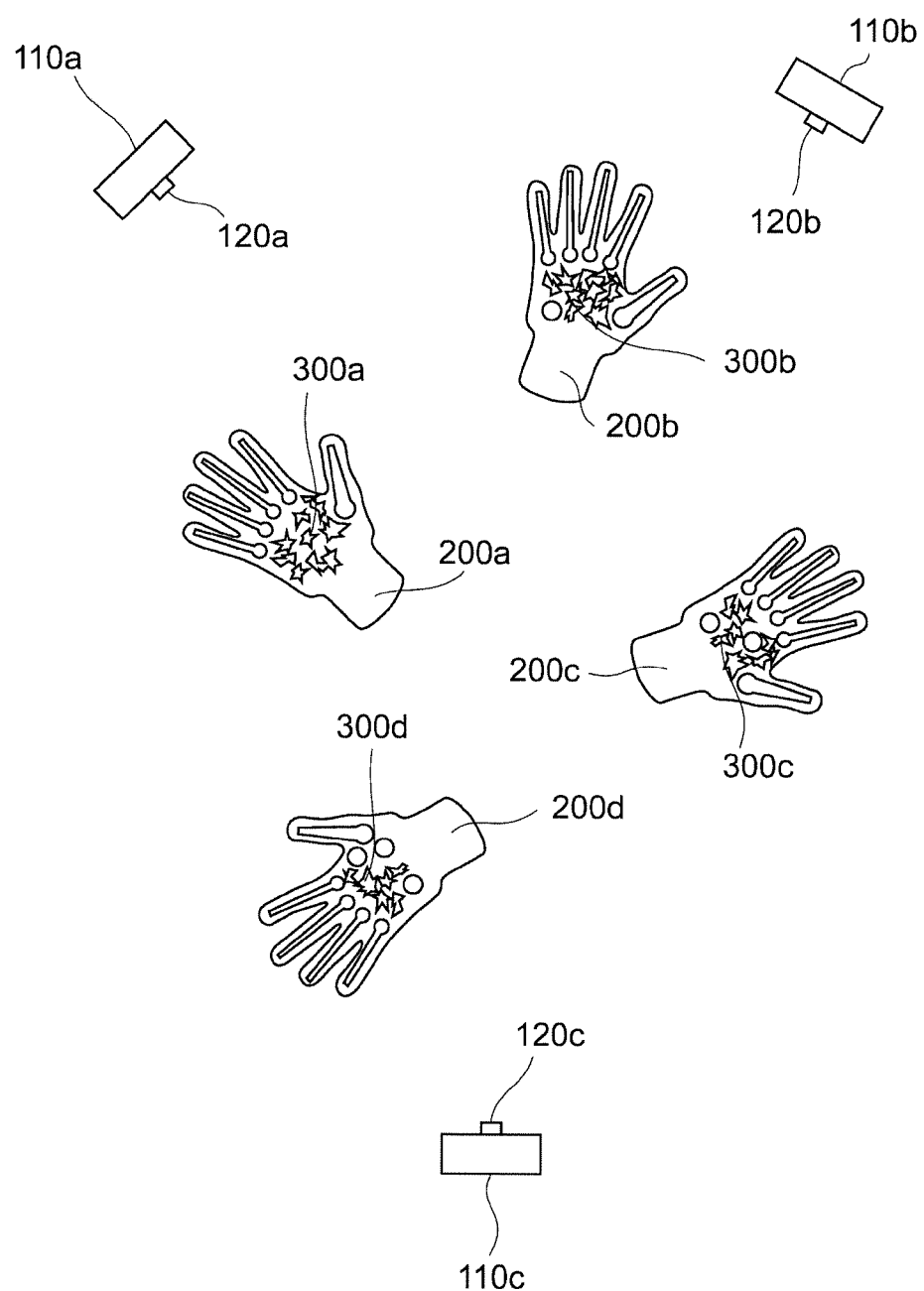
FIG. 13 is an illustration showing a state where markers attached to four gloves 200a to 200d are being processed by using three image processing devices 110a to 110c.

In the image processing system 100, it is possible to simultaneously process markers attached to a plurality of gloves 200 by using a plurality of image processing devices 110. This feature will now be described. FIG. 13 is an illustration showing a situation where markers attached to four gloves 200*a* to 200*d* are being processed by using three image processing devices 110*a* to 110*c*. In this situation, it would be inefficient for each of the image processing devices 110 to determine the states of structured markers for all the gloves 200*a* to 200*d*. Thus, in the image processing system 100, the fiducial-marker discrimination unit 141 of each of the image processing devices 110 is allowed to select a fiducial marker 500 for which the states of structured markers 900 are to be determined from among fiducial markers 500 (corresponding to the fiducial markers 300*a* to 300*d* attached to the gloves 200*a* to 200*d*) in captured images on the basis of predetermined priority conditions. As the predetermined priority conditions, for example, it is possible to adopt the discrimination accuracy of fiducial markers 500 or object IDs registered in advance.

Figure 14:
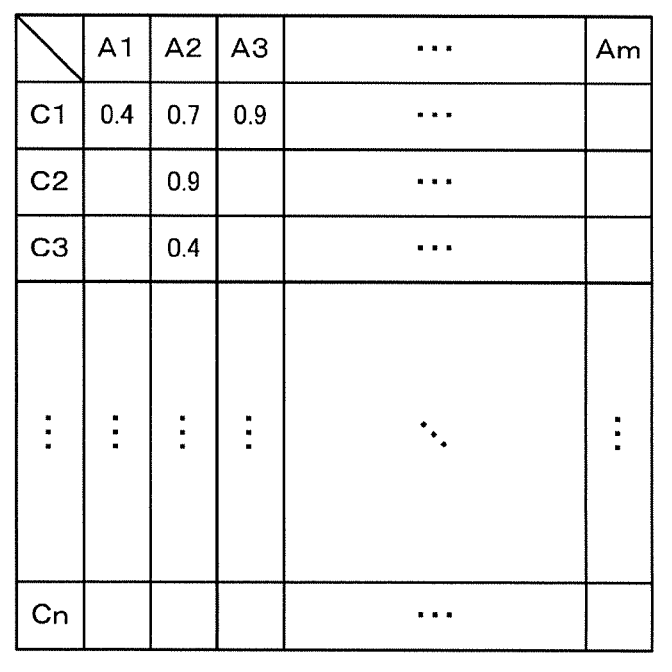

FIG. 14 is a diagram showing an example of an accuracy information table for selecting a fiducial marker 500 on the basis of discrimination accuracies. The accuracy information table is a matrix of image processing devices 110 (D1, D2, . . . , Dm) and object IDs (A1, A2, . . . , An), and values in a range of 0 to 1, representing discrimination accuracies, are set in the individual cells. It is assumed here that a value represents a higher discrimination accuracy as the value becomes closer to 1. The object IDs correspond to fiducial markers 500. The accuracy information table is stored, for example, in each of the image processing devices 100. It is possible to generate such an accuracy information table, for example, by means of the fiducial-marker discrimination unit 141 of each of the image processing devices 110 sending the discrimination accuracies of fiducial markers 500 to the other image processing devices.

For example, the fiducial-marker discrimination unit 141 of each of the image processing devices 100 can select objects having discrimination accuracies not less than a predetermined reference value from among the objects A1 to An. An upper limit to the number of objects that can be selected by the image processing devices 110 may be set. The upper limit may be variable in accordance with the processing abilities, etc. of the image processing devices 110. As another example, the configuration may be such that each of the plurality of objects A1 to An is selected by one of the image processing devices 110 having the highest discrimination accuracy for that object.

The operation instruction unit 146 outputs an operation instruction in accordance with the states of the structured markers 900, determined by the structured-marker determination unit 145, to the object discriminated on the basis of the object ID corresponding to the fiducial marker 500 discriminated by the fiducial-marker discrimination unit 141. Objects can be discriminated by using object IDs, and any object for which an operation instruction can be accepted may be adopted. As an example, objects may be user hand objects discriminated on the basis of object IDs. In this case, for example, the operation instruction unit 146 can control finger motions in a hand object displayed on the display 130 in accordance with the states of the structured markers 900. As another example, objects may be game characters discriminated on the basis of object IDs. In this case, for example, the operation instruction unit 146 can control character actions displayed on the display 130 in accordance with the states of the structured markers 900.

Figure 15A:
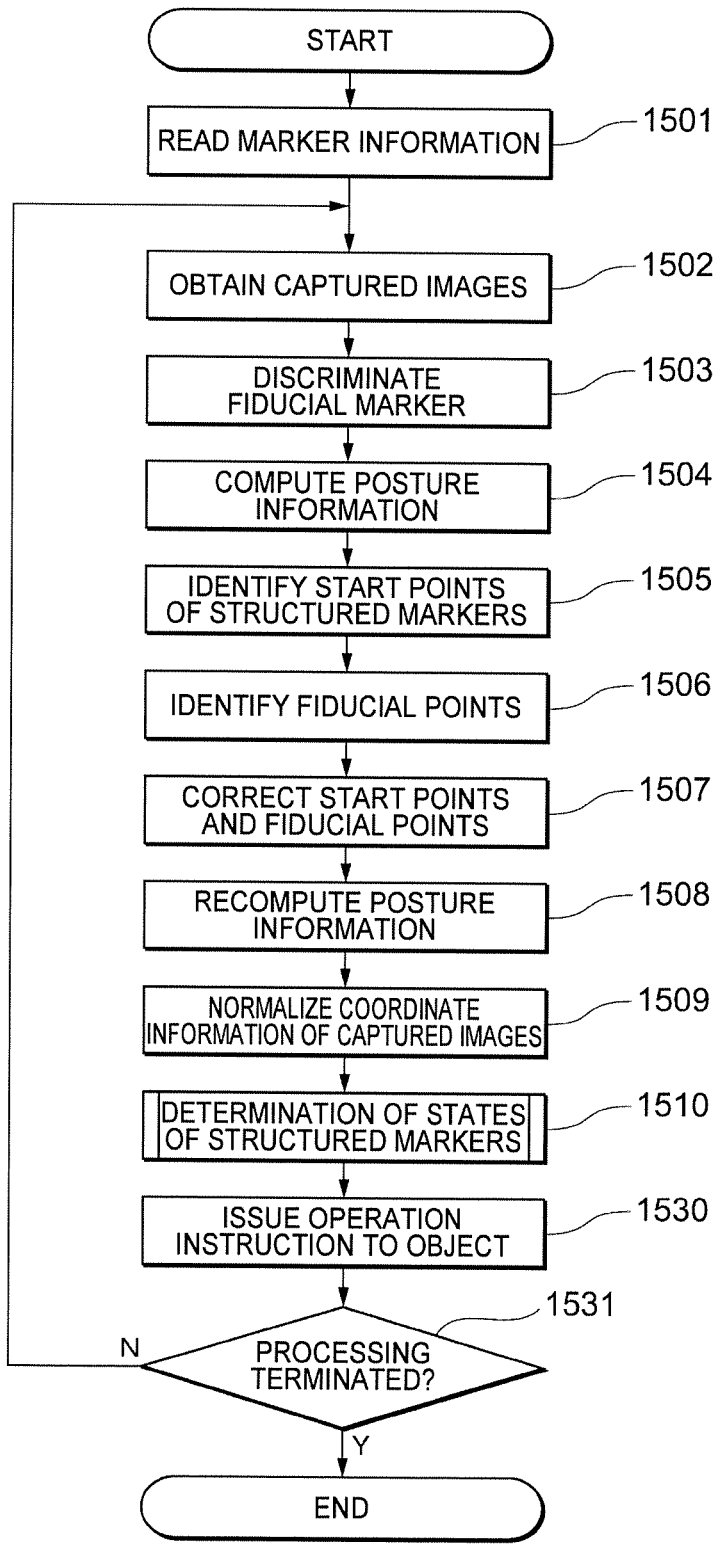
FIG. 15A is a flowchart showing an example of processing executed in the image processing system 100.
Figure 15B:
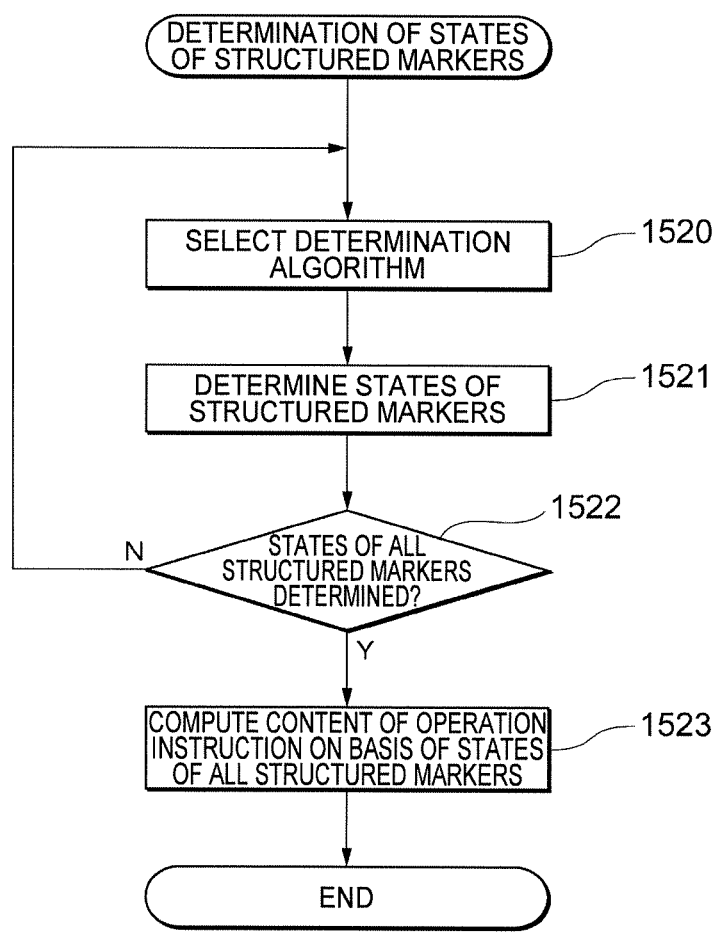
FIG. 15B is a flowchart showing an example of processing for determining the states of structured markers 900.

FIGS. 15A and 15B are flowcharts showing an example of processing executed in the image processing system 100. In the case where a plurality of image processing devices 110 exist in the image processing system 100, the processing shown in FIGS. 15A and 15B is executed at each of the image processing devices 110.

As shown in FIG. 15A, first, the fiducial-marker discrimination unit 141 reads the marker information stored in the marker-information storage unit 140 (S1501). As shown in FIG. 4, the marker information includes the fiducial-marker information 400, the structured-marker information 410, the fiducial-point information 420, and the object IDs 430. Then, the fiducial-marker discrimination unit 141 obtains captured images successively output from the camera 120 (S1502). Then, the fiducial-marker discrimination unit 141 discriminates a fiducial marker 500 from the captured images on the basis of the fiducial-marker information 400 stored in the marker-information storage unit 140 (S1503). At this time, the posture-information computation unit 150 of the fiducial-marker discrimination unit 141 also computes posture information of the discriminated fiducial marker 500 by solving a PnP problem on the basis of the fiducial marker 500 and the fiducial-marker information 400 stored in the marker-information storage unit 140 (S1504).

The start-point identification unit 142 identifies the start point or points 600 of one or more structured markers in captured images on the basis of the discriminated fiducial marker 500 and the structured-marker information 410 stored in the marker-information storage unit 140 (S1505). Furthermore, the start-point identification unit 142 identifies a plurality of fiducial points 610 in the captured images on the basis of the discriminated fiducial marker 500 and the fiducial-point information 420 stored in the marker-information storage unit 140 (S1506). Then, the start-point identification unit 142 corrects the start points 600 and the fiducial points 610 by way of mean shift (S1507).

Then, the posture-information recomputation unit 143 recomputes the posture information of the fiducial marker 500 by solving a PnP problem on the basis of the corrected fiducial points 610 (including some of the start points 600) and the fiducial-point position information stored in the marker-information storage unit 140 (S1508). Then, the normalization unit 144 normalizes the captured images, for example, by way of homography transformation, on the basis of the recomputed posture information such that the discriminated fiducial marker 500 takes a predetermined posture (S1509).

The structured-marker determination unit 145 executes processing for determining the states of structured markers in the normalized captured images (S1510). As shown in FIG. 15B, the structured-marker determination unit 145 selects an algorithm to be used for determining the states of the structured markers 900 on the basis of the structured-marker information 410 stored in the marker-information storage unit 140 (S1520). Then, the structured-marker determination unit 145 searches the captured images by using the selected algorithm, starting from the start point 600 in the normalized captured images, to determine the states of the structured markers 900 (S1521). The structured-marker determination unit 145 determines whether the determination of the states of all the structured markers 900 has been completed (S1522), and repeatedly executes the algorithm selection (S1520) and the state determination (S1521) in the case where the determination has not been completed (S1522:N). When the determination of the states of all the structured markers 900 has been completed (S1522:Y), the operation instruction unit 146 computes the content of an operation instruction for an object on the basis of all the structured markers 900 (S1523). Then, the procedure returns to the processing shown in FIG. 15A, and the operation instruction unit 146 issues an operation instruction for the object on the basis of the computed content of the operation instruction (S1530).

The above-described processing is executed in real time on the captured images successively output from the camera 120 until the termination of the processing is instructed (S1531:N). Then, for example, when the termination of the processing is instructed by means of a user operation (S1509:Y), the processing is terminated.

An embodiment of the present invention has been described above. As described above, according to this embodiment, a fiducial marker 500 is discriminated from captured images successively output from the camera 120 on the basis of marker information representing associations between fiducial markers and object IDs. Then, on the basis of the discriminated fiducial marker 500 and start-point position information defined in association with the fiducial marker, the start point or points 600 of one or more structured markers in the captured images are identified. Then, the states of one or more structured markers 900 continuing from the start points 600 are determined. Then, an operation instruction is output in accordance with the determined state or states of one or more structured markers 900 to the object discriminated on the basis of the object ID associated with the discriminated fiducial marker 500. As described above, according to this embodiment, it is possible to determine which object the discriminated fiducial marker 500 is associated with and to output an operation instruction to that object in accordance with the states of the structured markers 900.

Furthermore, according to this embodiment, the posture-information computation unit 150 and the posture-information recomputation unit 143 compute (determine) the posture of the discriminated fiducial marker 500 on the basis of a plurality of fiducial points associated with the fiducial marker 500. Then, the captured images are normalized on the basis of the computed posture such that the discriminated fiducial marker 500 takes a predetermined posture. Then, the states of one or more structured markers 900 are determined in the normalized captured images. By normalizing captured images such that the fiducial marker 500 takes a predetermined posture before determining the states of structured markers 900, as described above, it is possible to reduce the amount of calculation involved in determining the states of structured markers 900. Note that although a posture determination unit that determines the posture of the fiducial marker 500 is implemented by the posture-information computation unit 150 and the posture-information recomputation unit 143 in the example given in the context of the embodiment, the posture-information recomputation unit 143 is not a necessary component. That is, captured images may be normalized without recomputing the posture information computed by the posture-information computation unit 150.

Furthermore, according to this embodiment, it is possible to select at least one fiducial marker 500 for which the states of structured markers 900 are to be determined from among a plurality of discriminated fiducial markers 500 on the basis of predetermined priority conditions. This makes it possible, for example, to distribute processing loads among a plurality of image processing devices 110.

Note that the embodiment is given in order to facilitate the understanding of the present invention, not in order to limit the interpretation of the present invention. The present invention may be modified/improved without departing from the spirit thereof and encompasses equivalents thereof.

REFERENCE SIGNS LIST

100 Image processing system
110 Image processing device
120 Camera
130 Display

140 Marker-information storage unit
141 Fiducial-marker discrimination unit
142 Start-point identification unit
143 Posture-information recomputation unit
144 Normalization unit
145 Structured-marker determination unit
146 Operation instruction unit
150 Posture-information computation unit
200 Glove
210 AR space
220 Object
300, 500 Fiducial marker
310, 900 Structured marker
600 Start point
610 Fiducial point

What is claimed is:

1. A program stored on a non-transitory computer readable medium executable on a computer to perform:
   discriminating a fiducial marker from captured images successively output from a camera, based on marker information representing associations between fiducial markers and object identifiers;
   identifying start points of one or more structured markers in the captured images based on the discriminated fiducial marker and position information defined in association with the fiducial marker;
   determining states of the one or more structured markers continuing from the start points; and
   outputting an operation instruction in accordance with the determined states of the one or more structured markers to an object discriminated based on the object identifier associated with the discriminated fiducial marker.

2. The program stored on the non-transitory computer readable medium executable on the computer according to claim 1, wherein the program is executable on the computer to further perform:
   determining the posture of the discriminated fiducial marker based on a plurality of points defined in association with the fiducial markers; and
   normalizing the captured images based on the determined posture such that the discriminated fiducial marker takes a predetermined posture,
   wherein the determining the states of the one or more structured markers is performed in the normalized captured images.

3. The program stored on the non-transitory computer readable medium executable on the computer according to claim 1, wherein the program is executable on the computer to further perform:
   discriminating on a plurality of fiducial markers;
   identifying the start points of the one or more structured markers for each of the plurality of fiducial markers;
   determining the states of the one or more structured markers for each of the plurality of fiducial markers; and
   outputting, for each of the plurality of fiducial markers, the operation instruction in accordance with the determined states of the one or more structured markers to an object discriminated based on the object identifier associated with the fiducial marker.

4. The program stored on the non-transitory computer readable medium executable on the computer according to claim 1, wherein the program is executable on the computer to further perform:
   discriminating a plurality of fiducial markers;
   selecting at least one fiducial marker from among the plurality of fiducial markers based on a predetermined priority condition;
   identifying the start points of the one or more structured markers for each of the at least one fiducial markers;
   determining the states of the one or more structured markers for each of the at least one fiducial markers; and
   outputting, for each of the at least one fiducial markers, an operation instruction in accordance with the determined states of the one or more structured markers to an object discriminated based on the object identifier associated with the fiducial marker.

5. The program stored on the non-transitory computer readable medium executable on the computer according to claim 4, wherein the program is executable on the computer to further perform:
   selecting the at least one fiducial marker based on the predetermined priority condition in accordance with the individual discrimination accuracies for the plurality of fiducial markers.

6. The program stored on the non-transitory computer readable medium executable on the computer according to claim 5, wherein the program is executable on the computer to further perform:
   selecting the at least one fiducial marker based on the predetermined priority condition in accordance with the individual discrimination accuracies for the plurality of fiducial markers at the computer and one or more other computers.

7. The program stored on the non-transitory computer readable medium executable on the computer according to claim 4, wherein the program is executable on the computer to further perform:
   selecting the at least one fiducial marker based on the predetermined priority condition representing priority orders of the objects.

8. An image processing device comprising:
   a fiducial-marker discrimination unit that discriminates a fiducial marker from captured images successively output from a camera, based on marker information representing associations between fiducial markers and object identifiers;
   a start-point identification unit that identifies the start points of one or more structured markers in the captured images based on the discriminated fiducial marker and position information defined in association with the fiducial marker;
   a structured-marker determination unit that determines the states of the one or more structured markers continuing from the start points; and
   an operation instruction unit that outputs an operation instruction in accordance with the determined states of the one or more structured markers to an object discriminated based on the object identifier associated with the discriminated fiducial marker.

* * * * *